United States Patent
Lyu et al.

(10) Patent No.: US 10,789,008 B2
(45) Date of Patent: Sep. 29, 2020

(54) REDUCING WRITE COLLISIONS IN DATA COPY

(71) Applicant: INTERNATIONAL BUSINESS MACHINES CORPORATION, Armonk, NY (US)

(72) Inventors: Gang Lyu, Shanghai (CN); Xue Qiang Zhou, Shanghai (CN)

(73) Assignee: International Business Machines Corporation, Armonk, NY (US)

( * ) Notice: Subject to any disclaimer, the term of this patent is extended or adjusted under 35 U.S.C. 154(b) by 16 days.

(21) Appl. No.: 16/204,322

(22) Filed: Nov. 29, 2018

(65) Prior Publication Data
US 2020/0174670 A1    Jun. 4, 2020

(51) Int. Cl.
| | | |
|---|---|---|
| G06F 12/00 | (2006.01) | |
| G06F 3/06 | (2006.01) | |
| G06F 12/0804 | (2016.01) | |
| G06F 13/00 | (2006.01) | |
| G06F 13/28 | (2006.01) | |

(52) U.S. Cl.
CPC ............ G06F 3/065 (2013.01); G06F 3/0619 (2013.01); G06F 3/0644 (2013.01); G06F 3/0673 (2013.01); G06F 12/0804 (2013.01); G06F 2212/1032 (2013.01); G06F 2212/608 (2013.01)

(58) Field of Classification Search
CPC ...... G06F 3/065; G06F 3/0619; G06F 3/0644; G06F 3/0804; G06F 3/0673; G06F 2212/608; G06F 2212/1032
See application file for complete search history.

(56) References Cited

U.S. PATENT DOCUMENTS

| | | | |
|---|---|---|---|
| 7,325,159 B2 | 1/2008 | Stager et al. | |
| 7,689,597 B1 | 3/2010 | Bingham et al. | |
| 7,711,858 B2 | 5/2010 | Ofer et al. | |
| 7,885,923 B1 | 2/2011 | Tawri et al. | |
| 8,341,121 B1 * | 12/2012 | Claudatos ........... | G06F 11/1451 707/640 |
| 8,719,497 B1 | 5/2014 | Don et al. | |
| 8,924,352 B1 * | 12/2014 | Andruss .............. | G06F 11/1461 707/640 |
| 8,959,284 B1 * | 2/2015 | Boyle ................. | G06F 12/0866 711/113 |
| 9,135,064 B2 | 9/2015 | Dinker | |
| 10,185,628 B1 * | 1/2019 | Snyder .................. | H04N 7/181 |

(Continued)

OTHER PUBLICATIONS

Dislcosed Anonymously, "I/O Priority Management for Copy Services Relationships", IP.com Prior Art Database Technical Disclosure, Aug. 19, 2010, 5 pages, IPCOM000198983D.

(Continued)

*Primary Examiner* — Mark A Giardino, Jr.
(74) *Attorney, Agent, or Firm* — L. Jeffrey Kelly

(57) ABSTRACT

Disclosed is a method, system and computer program product for forming a consistency group to define a dataset of point-in-time data to be copied from a source volume to a target volume; setting copy priorities for respective data in the dataset; and transmitting the respective data in the order of the copy priorities from the source volume to the target volume, wherein the copy priorities are dynamically adjusted in response to arrival of write data during transmission of the data.

17 Claims, 7 Drawing Sheets

(56) References Cited

U.S. PATENT DOCUMENTS

2011/0313974 A1\* 12/2011 Chen .................. G06F 11/1451
707/654
2020/0004640 A1\* 1/2020 Singhal ............... G06F 9/45558

OTHER PUBLICATIONS

Johnson, "Is continuous data protection effective enough to be the only full data copy for disaster recovery?", ComputerWeekly.com, May 17, 2018, 4 pages.

Mell et al., "The NIST Definition of Cloud Computing", National Institute of Standards and Technology, Special Publication 800-145, Sep. 2011, pp. 1-7.

\* cited by examiner

REDUCING WRITE COLLISIONS IN DATA COPY

BACKGROUND

The present invention relates to data processing, and more specifically, to a method, system and computer program product for reducing data collisions in a snapshot-based data transmission for data protection.

Various solutions of a snapshot (i.e., a point-in-time copy) based data protection have been designed. One such solution is to copy snapshot data (i.e., point-in-time data) from the source volume to the target volume in different sessions at defined intervals. A background copy task is executed to copy point-in-time data from the source volume to the disk of the target volume. The data copied in the different sessions may be restored from the target volume when necessary. To save system resources for other high priority jobs, the speed of the background copy task is limited. In the course of data copying by the copy task, write data collision may occur, which may impact the performance of the host system.

SUMMARY

According to one embodiment of the present invention, a computer-implemented method is provided. The method includes forming a consistency group defining a set of point-in-time data to be copied from a source volume to a target volume. The method further includes setting copy priorities for respective data in the dataset. The method also includes transmitting the respective data in the order of the copy priorities from the source volume to the target volume. The copy priorities are dynamically adjusted in response to the arrival of write data during the transmitting to reduce the probability of the write data collision in the point-in-time copy based data protection.

According to another embodiment of the present invention, a system includes one or more processors and a computer-readable memory coupled to the one or more processors. The computer-readable memory includes instructions that when executed by the one or more processors, perform an action of forming a consistency group defining a set of point-in-time data to be copied from a source volume to a target volume. The instructions also set copy priorities for respective data in the dataset and transmitting the respective data in the order of the copy priorities from the source volume to the target volume. The copy priorities are dynamically adjusted in response to the arrival of write data during the transmitting.

According to another embodiment of the present invention, a computer program product includes a computer readable storage medium having program instructions embodied therewith. The program instructions are executable by a processor to cause the processor to perform an action of forming a consistency group defining a set of point-in-time data to be copied from a source volume to a target volume. The program instructions also set copy priorities for respective data in the dataset and transmitting the respective data in the order of the copy priorities from the source volume to the target volume. The copy priorities are dynamically adjusted in response to the arrival of write data during the transmission.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
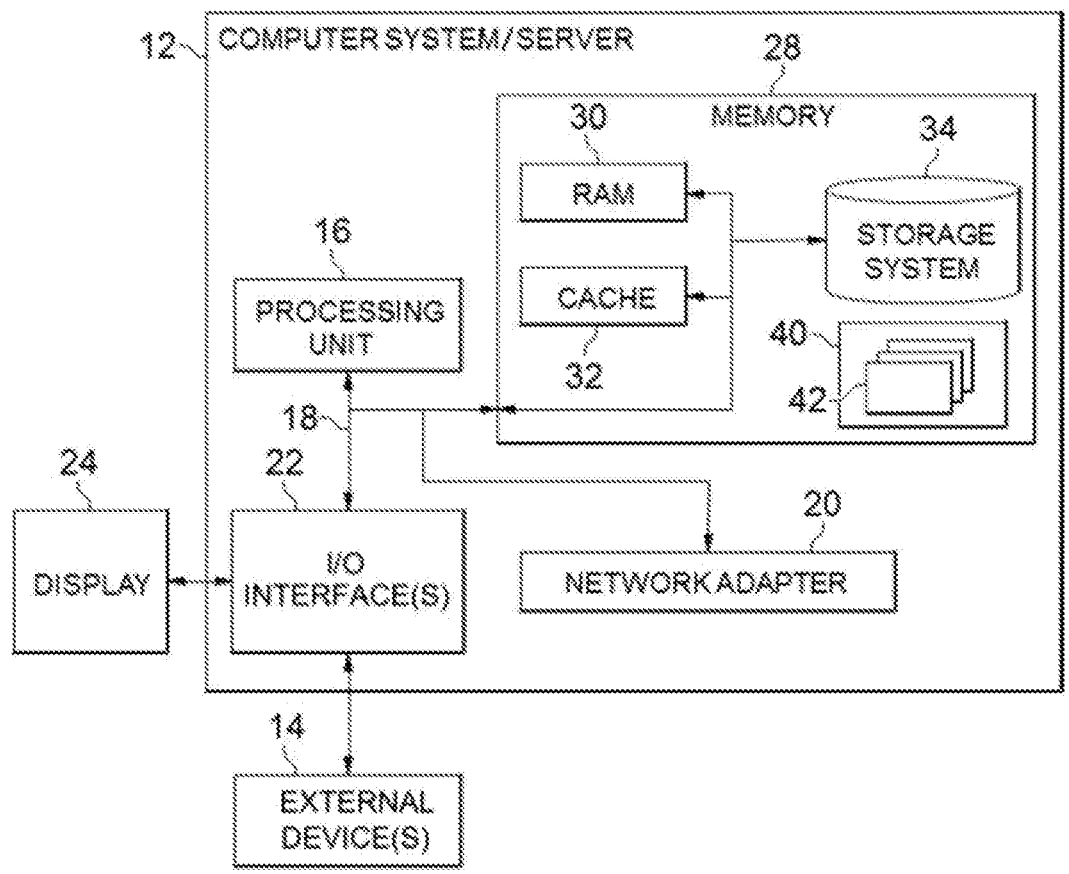
FIG. 1 depicts a cloud computing node according to an embodiment of the present invention.

Some embodiments will be described in more detail with reference to the accompanying drawings, in which the embodiments of the present disclosure have been illustrated. However, the present disclosure can be implemented in various manners, and thus should not be construed to be limited to the embodiments disclosed herein.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12 or a portable electronic device such as a communication device, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random-access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
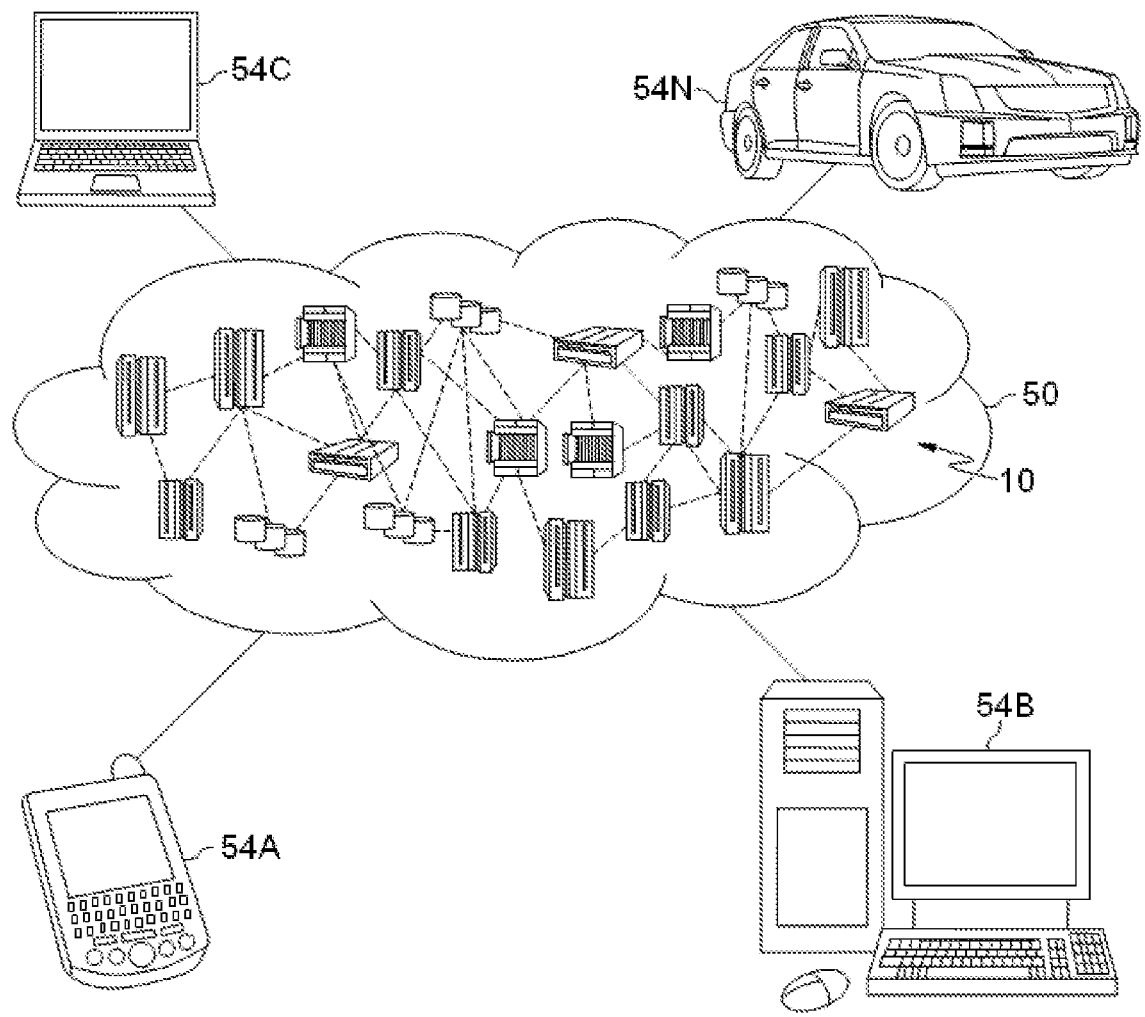
FIG. 2 depicts a cloud computing environment according to an embodiment of the present invention.

Referring now to FIG. 2, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
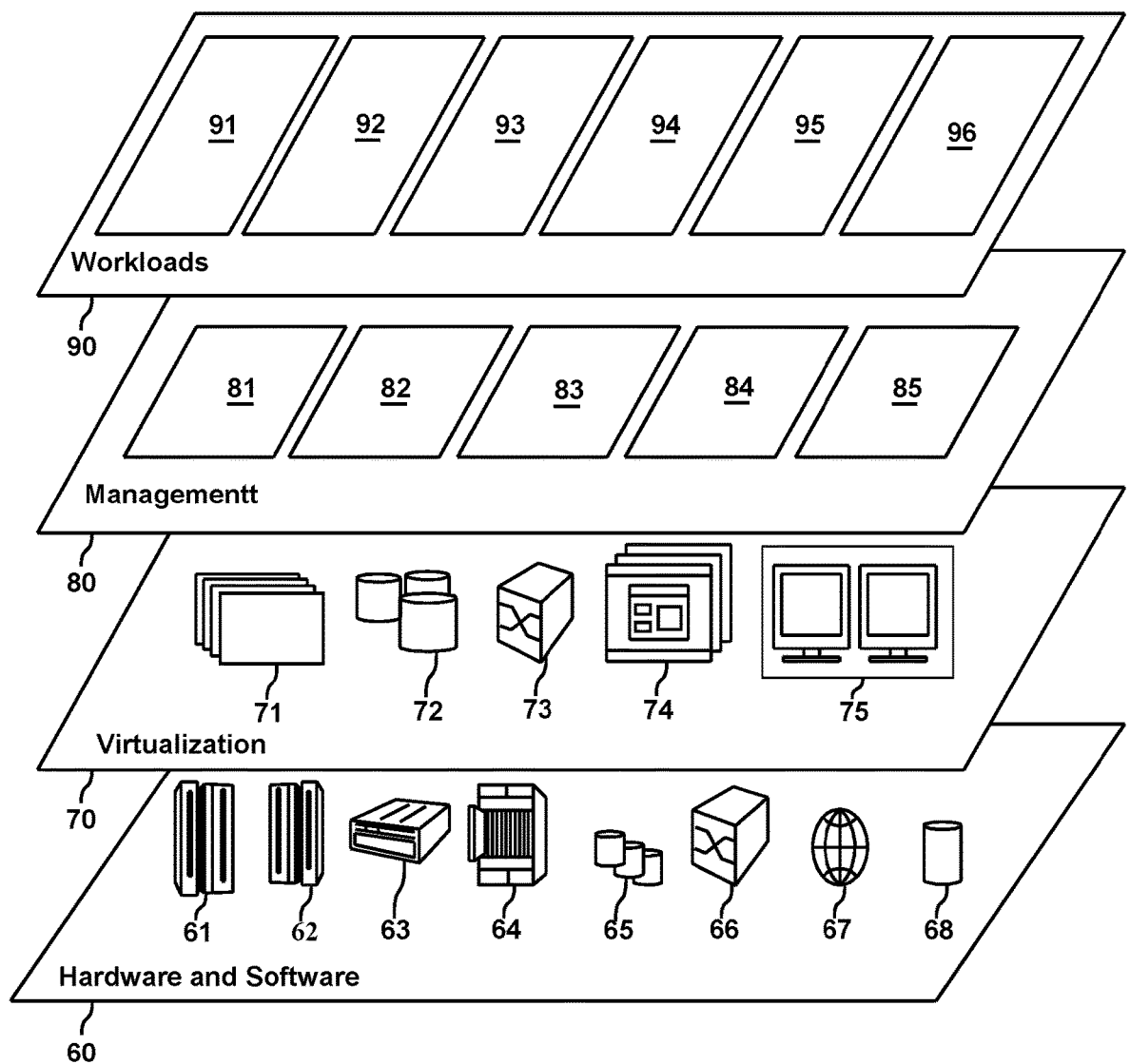
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture-based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and service processing 96. Service processing 96 may implement a solution for reducing data collisions in a data copy.

With reference now to FIG. 4 to FIG. 7, exemplary embodiments of the present invention will be described. The exemplary embodiments are directed to a method, system and computer program product for reducing data collisions in snapshot-based data transmission for data protection.

It should be noted that the processing of the method for reducing data collisions in snapshot-based data transmission for data protection according to embodiments of this disclosure could be implemented by computer system/server 12 of FIG. 1.

Figure 4:
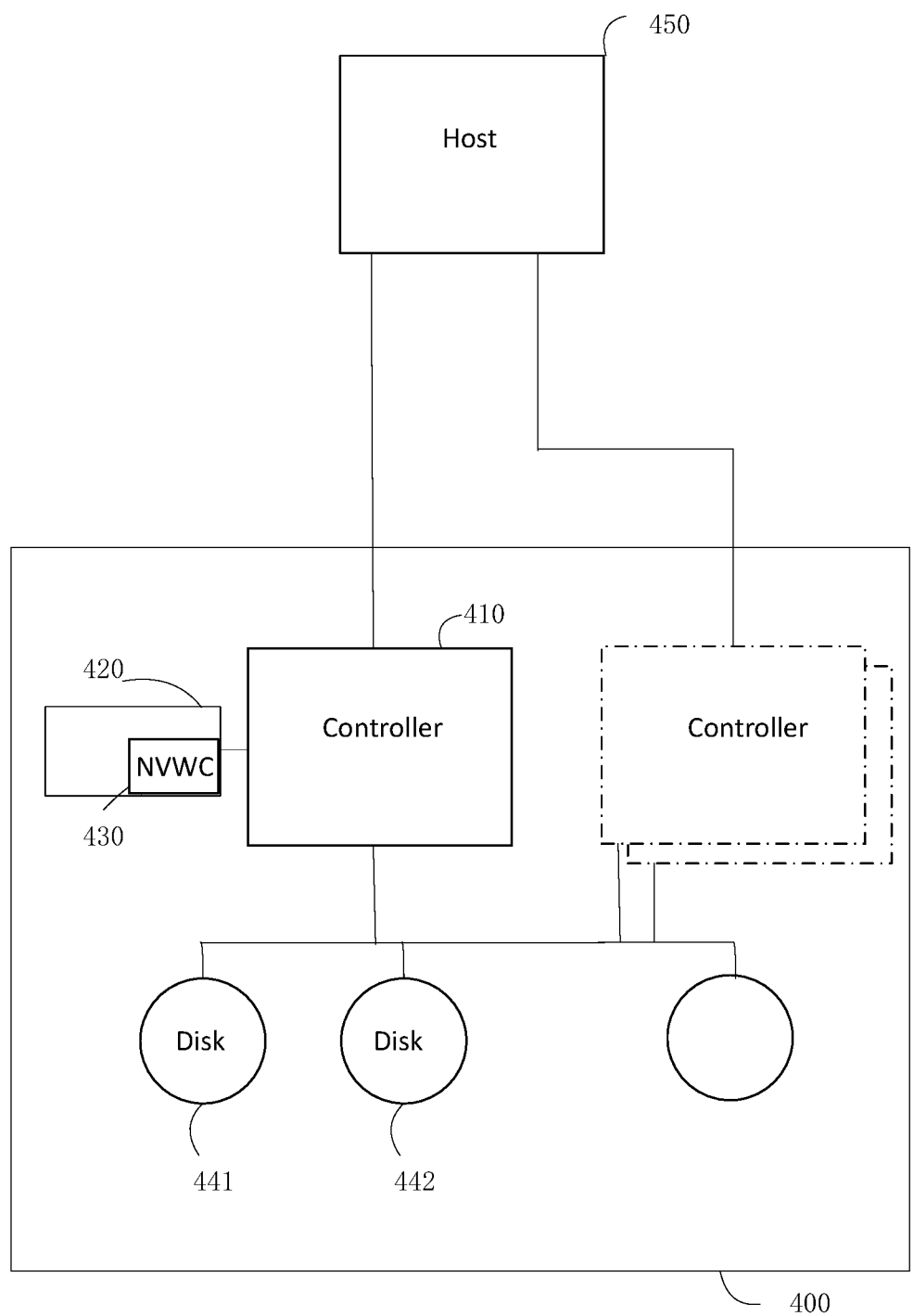
FIG. 4 illustratively shows an environment in which embodiments in accordance with the invention may be implemented.

Referring now to FIG. 4, which illustratively shows an environment in which embodiments in accordance with the invention may be implemented. FIG. 4 depicts a storage system 400 comprising a storage controller 410 and an array of disks 441,442 . . . . Storage controller 410 may access a memory 420 and a non-volatile write cache (NVWC) 430. NVWC 430 may be a part of cache space in memory 420 which is protected by the battery against the loss of power.

A host 450 is shown to have a communication connection with a storage controller 410. The host 450 may direct I/O requests to the storage controller 410 to write or read data with respect to the array of disks. In addition to responding to the I/O requests, the storage controller 410 may provide for capabilities of managing an operation of the disk array.

Communications between the host 450, storage controller 410, memory 420, NVWC 430 and the array of disks may be conducted via connections that may be any of several well-known, standard communication media and protocols, for example, a parallel SCSI connection or a Fibre Channel connection.

As shown in FIG. 4, the storage controller 410 may be one of a number of storage controllers of the storage system 400. As shall be appreciated by those skilled in the art, storage controller 410 may perform the methods defined herein independently or in conjunction with any number of other storage controllers. Alternatively, storage controller 410 may also have the ability to cooperate with a separate module in which any embodiment of the inventions is implemented.

As mentioned above, a snapshot-based data protection solution may involve the execution of a background copy task to copy data from source volumes to target volumes. The background copy task implementing the methods defined herein may be presumed to be performed by storage controller 410 or a separate module in conjunction of storage controller 410. An extension of the practice to other components may be a matter of design choice known to those skilled in the art.

To facilitate description of various embodiments of the invention, some terms used herein will be defined first.

The term "source volume" refers to at least one disk and at least one non-volatile write cache from which point-in-time data is copied to a target volume for protection. In the following description, disk 441 shown in FIG. 4 is used to represent the at least one disk, and NVWC 430 is used to represent the at least one non-volatile write cache. Disk 441 will be referred to as "source disk" or "source disks".

The term "target volume" refers to at least one disk to which data will be copied from a source volume for protection. In the following description, disk 442 is used to represent the at least one disk, which will also be referred to as "target disk" or "target disks".

The term "stage" refers to moving or copying data from a disk to a memory or cache, for example, from source disk 441 to memory 420.

The term "destage" refers to moving or copying data from a memory or cache to disk, for example, from memory 420 to target disk 442 or from NVWC 430 to target disk 442.

The term "Copy-Source-to-Target" refers to a data copy operation of staging data from source disk 441 to memory 420 and then destaging the data from memory 420 to target disk 442.

The term "Destage-Source-to-Target" refers to a data copy operation of destaging data from NVWC 430 of source volume to target disk 442.

As mentioned above, a background copy task may be executed to copy data for data protection. In the context of the present invention, the background copy task may perform Copy-Source-to-Target operations session by session at regular or variable intervals. The time interval (TI) between two consecutive sessions may be defined for the copy task in advance. The copy task will begin to copy point-in-time data from a source volume to a target volume at the start of each session.

To copy data from the source volume to the target volume, the copy task may stage the point-in-time data from the source disk 441 to the memory 420 and then de-stage the data from the memory 420 to the target disk 442. To ensure the performance of host 450, which also uses memory 420, the throughput of the copy task may be limited, and thus the speed of the copy task may be slow.

Write data collisions or write collisions may be common when there are I/O operations with respect to the disk storage. Write collisions may also occur when the background copy task is performing the Copy-Source-to-Target operation. For example, a write collision will occur when a write data issued from host 450 arrives while an old version of the data is held in NVWC 430.

A write collision may be handled when the new version of data waits for the destage of the old version of data, for example, by moving the new version out of the NVWC 430 to the target disk 442. In this case, the acknowledgement to the host 450 may be delayed and the host command may hang and create a degraded performance of the host 450. One other way a write collision may be handled is when the new version of data is written into the NVWC 430. If the new version of data is written into the NVWC 403, then there may exist two versions of the same data in NVWC 430. Two versions may be an excessive use of space of the NVWC 430, which may also degrade performance of the performance host 450. Therefore, these two write collision solutions may not contribute to alleviate the impact of the write collision on the performance of the host 450.

To alleviate host 450 performance degradation, write collisions can be reduced. The present invention may reduce the probability of write collisions (i.e., conflicts) during the operation of the background copy task for the point-in-time copy based data protection. The present invention proposes to assign copy priorities for different kinds of data according to the probability, urgency and severity of the write collision. The present invention may then copy the different kinds of data according to the copy priorities.

The present invention may calculate the ideal speed of the copy task by using and identifying the amount of modified data to be copied and the remaining time to form a next consistency group. Calculating the ideal speed of the copy task may provide information to allow for an adjustment of the speed of the copy task by adjusting the tiers of data to be allocated to the target volume, to the number of agents and to the priority of the copy task. More than one agent may be allocated to make use of, for example, parallel processing capabilities. The number of allocated agents to handle a copy task may relate to the speed in which a task is accomplished, such as more agents may provide a faster Copy-Source-to-Target task, and vice versa.

Figure 5:
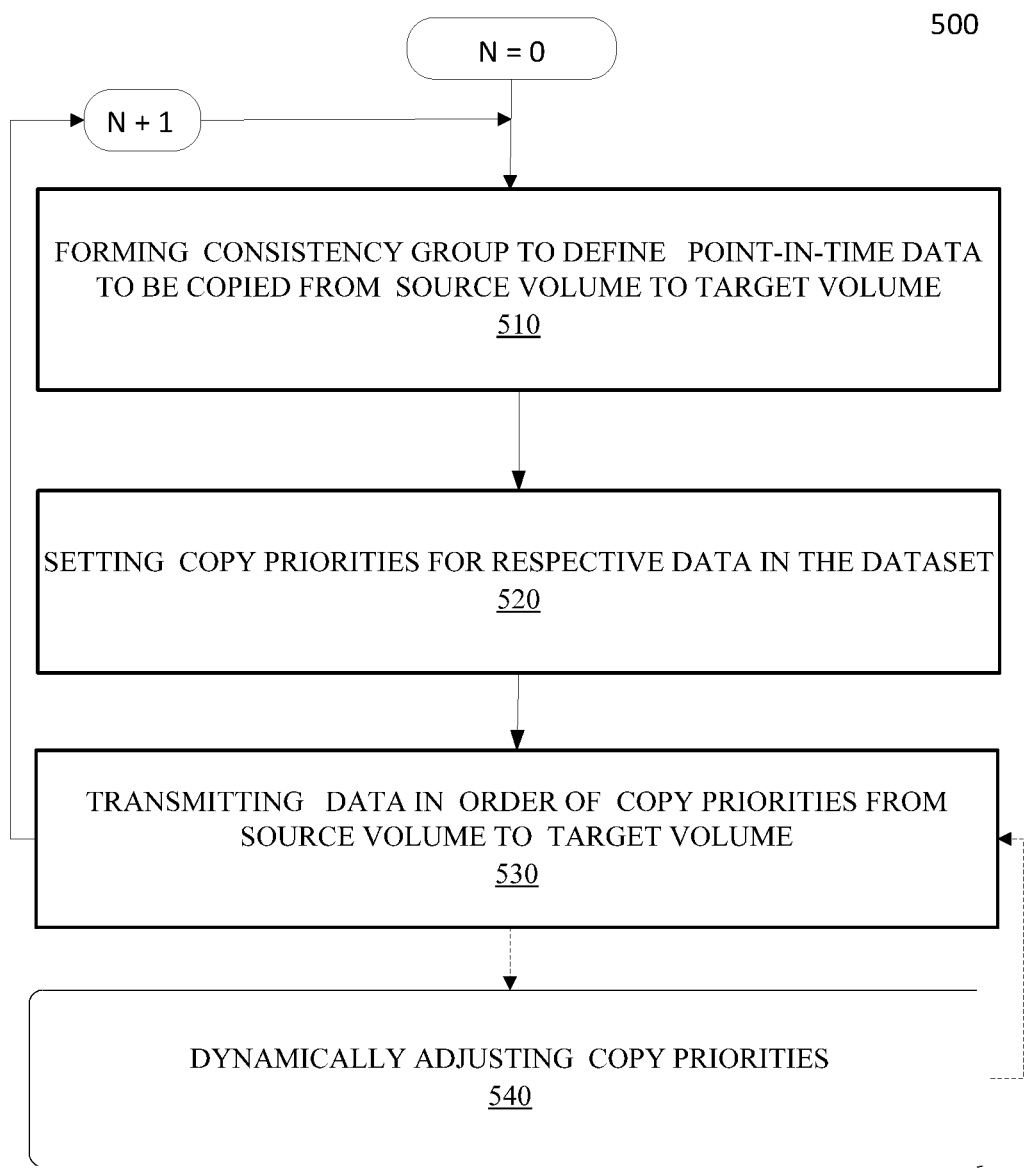
FIG. 5 is a flowchart of the general process of a method according to an embodiment of the invention.

Referring now to FIG. 5, which is a flowchart of the general process of a computer-implemented method 500 according to an embodiment of the invention. As shown, method 500 includes a step 510 of forming, by one or more processors, a consistency group defining a set of point-in-time data to be copied from a source volume to a target volume. A step 520 of setting, by one or more processors, copy priorities for respective data in the dataset and a step 530 of copying, by one or more processors, the respective data in the order of the copy priorities from the source volume to the target volume.

Beginning with step 510, the start of a present session for a point-in-time data copy. Step 510 involves forming a consistency group to define a set of point-in-time data to be copied from a source volume to a target volume.

A consistency group may mean a collection of volumes in a storage array which are the source of a snapshot image and may define a set of data. The data set may include data in the source volume at a time point that may have been modified since the last time point. The time point of the data to be copied in a present session may be denoted as t(N), wherein N is an integer representing the number of the present session. The data set may include all data that has been modified since t(N−1), which is the time point of the data copied in session N−1 (i.e., the previous data copy session).

To determine what data has been modified, a bitmap may be used to record addresses of data as they are modified between time point t(N−1) and time point t(N). Each bit in the bitmap may be mapped to a data address of a modified data at time point t(N) for data copy session N. All of the bits in the bitmap may be mapped to all of the modified data. In this way, the data set including data to be copied in session N may be determined.

In the bitmap, each bit that is mapped to the data address corresponding to a to-be-copied data may be initially set to 1. After the data corresponding to the data address is copied to the target volume, the bit may be reset to 0. Thus, during the data copy session, any data that remains to be copied may be identified from the bitmap.

Upon forming the consistency group (CG) at 510, step 520 may be executed. Executing step 520 may set copy priorities for respective data in the dataset.

In the context of the present invention, the term "priority" may be associated with the data to represent the copy priority of the data. It also may represent the priority to execute the Copy-Source-to-Target operation for the associated data in the source disk 441 and the Destage-Source-to-Target operation for the associated data in the NVWC 430. Respective data represented by the target bitmap may be copied in the order of copy priority. The data with higher priority may be transmitted earlier that the data with lower priority. For example, the priority may be set to a value of 1, 2, . . . K. The lower number may stand for a higher priority, for example, priority 1>priority 2.

It may be noted that the priority is relative. For example, priority 1 represents the highest priority. If currently there is no priority 1 associated to any data, then priority 2 may represent the highest priority.

According to an embodiment of the invention, step 520 may include the following processing in response to a determination that data in the dataset is held in the NVWC 430 of the source volume and an old version of the data is in the disk 441 of the source volume. The old version may have, for example, been copied to the disk 442 of the target volume and may have been set to a priority 3 for the data, which may be two-degrees or levels lower than the highest priority.

Figure 6:
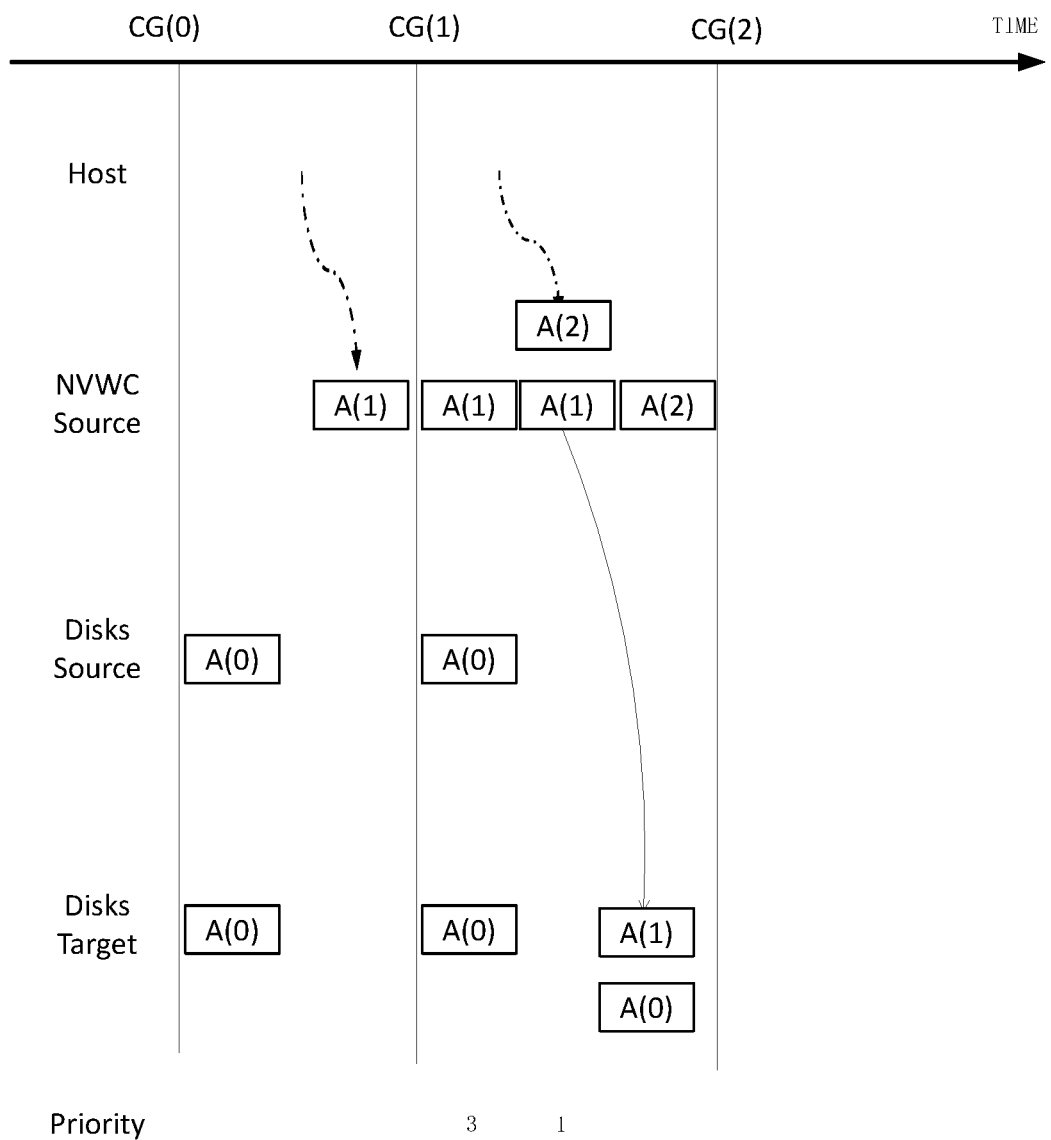
FIG. 6 and FIG. 7 illustrate examples of the process of the method according embodiments of the invention.

Referring now to FIG. 6, which illustrates a process of a data copy. The horizontal line represents time. The three vertical lines represent the time of forming consistency group CG(0), CG(1) and CG(2). A(0), A(1) and A(2) represent three versions of the data A with respect to a same data address. A(1) is older than A(0), and A(2) older than A(1). At the bottom, the two values "3" and "1" represent the relative priority set for corresponding data according to the present invention. The data copy process may be represented as follows.

After CG(0) is formed, data A(0) may be copied form the disks of the source volume to the disks of the target volume. Then data A(1) may arrive from the host. A(1) is written into non-volatile write cache of the source volume, but may not be destaged into the disks of the source volume by cache algorithm. CG(1) may then be formed. A(1) may be held in NVWC of the source volume. A(0) that is stored in the disks of the source volume may have been copied to the disks of the target volume.

The Destage-Source-to-Target of A(1) may be set to priority 3, which is two-degrees lower than the highest priority of 1. Then, A(2) arrives. Since A(1) is held in NVWC, A(2) has to wait in memory for the destage of A(1) and then the write collision happens. Next, priority 1 is set to Destage-Source-to-Target of A(1). After A(1) is destaged to the disks of the target volume, then A(2) can been written into the NVWC and an acknowledgement is returned to the host.

For example, assume A(i) [i=0, . . . , N−1] represents a data A of version i. It may be determined that A(i) is held in the NVWC 430, and there may be no corresponding data A(j) [j=1, . . . , N, i*>j] of the previous version in the source disk 441 that needs to be copied to the target disk 442. In this situation, if a write data collision happens due to a write request from the host 450, then the write request must wait for at least one destage operation for A(i). Therefore, relative priority 3 may be assigned to A(i). A Destage-Source-to-Target operation for data A(i) may be performed with priority 3.

According to an embodiment of the invention, step 520 may further include, in response to a determination that a data of the dataset held in a NVWC is a new version of a data stored in a disk 411 of the source volume, setting priority 2 for both the data held in the NVWC and the data stored in the disk, which may be one-degree lower than the highest priority.

For example, it is determined that data A(i) [i=0, . . . , N−1] is held in the NVWC 430 and there is a corresponding A(j) [j=1, . . . , N−1, i>j] in the source disk 441 that has not been copied to the target disk 442. In this situation, if a write data collision happens due to a write request from the host 450, the request must at least wait for the completion of the Copy-Source-to-Target operation for A(j) and the Destage-Source-to-Target operation for A(i). Therefore, a relative high priority of 2 may be set for A(j) and A(i). That means both the Copy-Source-to-Target operation for A(j) and the subsequent Destage-Source-to-Target operation for A(i) will be performed with relative priority 2.

According to an embodiment of the invention, step 520 may further involve assigning priority 5 or lower to the respective data in the order of the write frequency such that a higher priority is associated with a higher write frequency, which is a priority of four-degrees below the highest priority or lower.

Those skilled in the art shall appreciate that the probability of write data collision at an address is relevant to the frequency at which the data is written to that address. As is known to those skilled in the art, the write frequency of data may be acquired with various existing storage tiering techniques known in the art.

For example, for the data included in the dataset and stored in source disk 441, priority 5 and below may be assigned according to write frequency to the associated address. For example, for hot data of high write frequency, the priority is set to 5. For cold data of low write frequency, the priority is set to 7. For data of the intermediate write frequency, the priority is set to 6.

As mentioned above, data with higher write frequency may be copied earlier. By executing Copy-Source-to-Target for data in the source disk according to write frequency, the probability of write data collision may be lowered.

After step 520, priorities may have been assigned to all data in the dataset. Then, step 530 may be executed to transmit the respective data in the order of the priorities from the source volume to the target volume. Step 530 may involve performing Copy-Source-to-Target operations with respect to data in the disks of the source volume and Destage-Source-to-Target operations with respect to data in the NVWC of the source volume until all data may be copied from the source volume to the target volume. Then the current cycle of data copy is completed.

According to an embodiment of the invention, method 500 may further include step 540 that adjusts the copy priorities dynamically. Transmitting the respective data in the order of the copy priorities may include copying the respective data in the order of the copy priorities that have been dynamically adjusted. In other words, during the transmission of the data from the source volume to the target volume, the priorities may be re-adjusted.

According to an embodiment of the invention, in response to the arrival of a new version of data corresponding to a data in the disk of the source volume for the first time, the priority may be reset to three-degrees lower than the highest priority for the data in the disk.

Assuming data A(N) corresponding to A(j) [j=0, . . . , N−1] in the source disk 441 arrives for the first time, and there is no previous data version in the NVWC 430, then A(N) may be written into the NVWC 430. The priority of A(j), which may not be higher than 4, may be raised to a priority of 4, which is three-degrees lower than the highest priority of 1. In this situation, a write data collision is possible on the next data copy session due to a write request from the host 450. The write request must wait for the completion of at least one stage operation and two destage operations. Therefore, raising priority of A(j) will reduce the probability of the write data collision.

Figure 7:
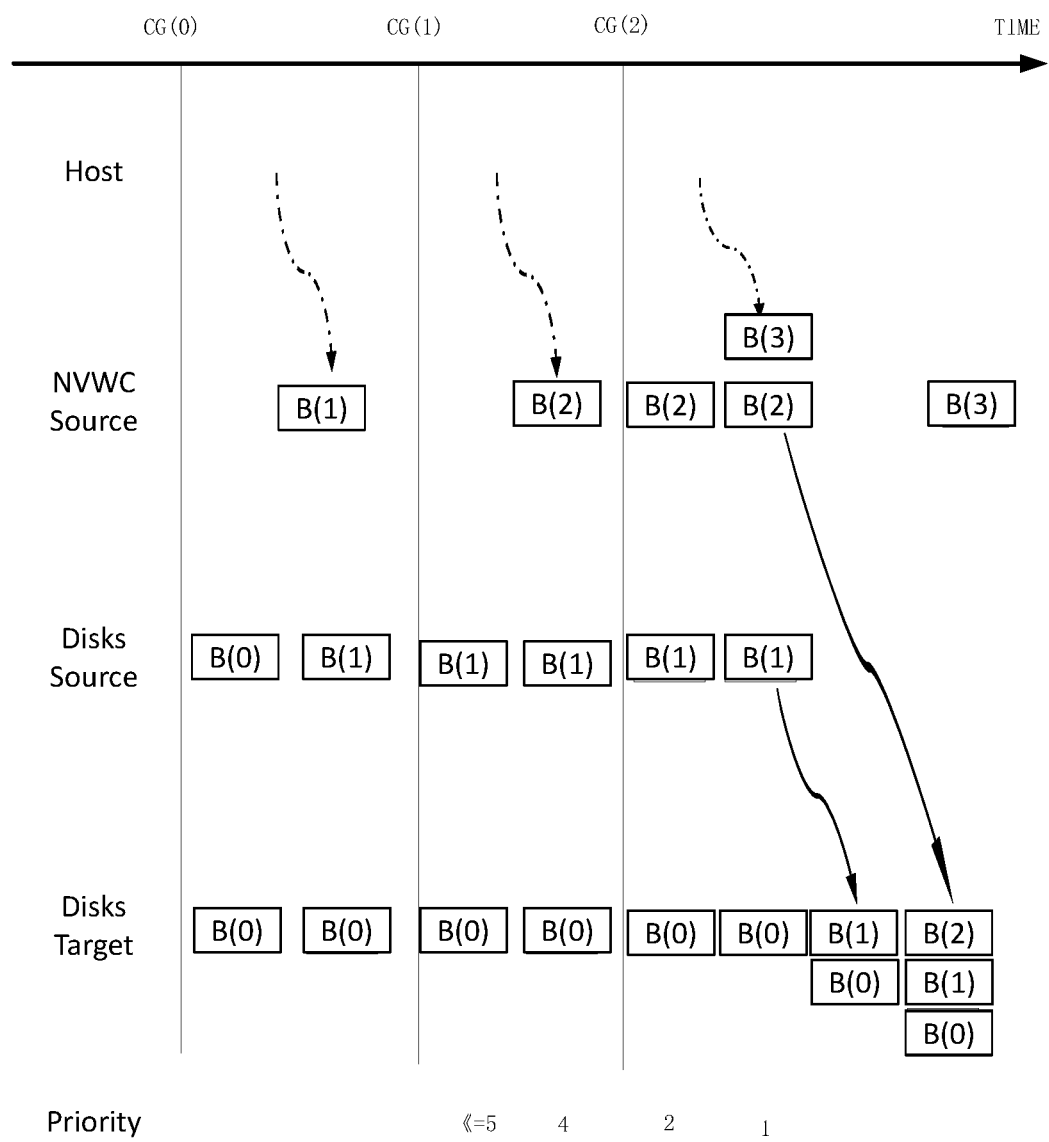

Refer to FIG. 7, which illustrates a process of data copy. The layout of FIG. 7 is similar to FIG. 6, wherein B(0), B(1) and B(3) represent three versions of data associated with the same data address. And at the bottom, the symbol "<=5" refers to a priority value of 5 or lower that may be assigned to relevant data according the present invention. As can be seen in FIG. 7, at a time after CG(1) is formed, data B(1) is in the disk 411. Then, the new version of B(1), named B(2) arrives for the first time. There is no previous data version in the NVWC 430, so B(2) may be written to the NVWC 430. Priority 4 may then be set for B(1).

According to an embodiment of the invention, in response to the arrival of a new version of data corresponding to a data held in the NVWC of the source volume for the first time, the priority for the data held in the NVWC may be reset to the highest priority. For example, if A(i) is the data held in the NVWC, which is an old version of the new version of data A(N), then the priority for A(i) is reset to 1. In other words, Destage-Source-to-Target operation of data(i) may be set to priority 1.

In addition, if there is also an old version of data A(j) in the disk of the source volume that corresponds to the new version of data A(N), the priority for A(j) is also reset to the highest priority. In other words, Priorities for both Copy-Source-to-Target operation for A(j) and subsequent Destage-Source-to-Target operation for A(j) are reset to priority 1.

Refer to FIG. 7, after CG(2) is formed and during the data copy operation, data B(3) arrives from the host. An old version B(2) may be held in the NVWC. The priority of the old version B(2) may be 2. The priority of B(2) may be reset to 1. In addition, another old version B(0) in the source disk may not yet be copied. The priority of B(1) may also be reset to 1.

From the above description it may be seen that in performing step 530, the copy priorities may be adjusted dynamically. With the adjusted priority, the probability of write data collisions may be further reduce in the process of transmitting the data from the source volume to the target volume.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may

What is claimed is:

1. A computer-implemented method, comprising:
forming, by one or more processors, a consistency group defining a dataset of point-in-time data to be copied from a source volume to a target volume;
setting, by one or more processors, copy priorities for respective data in the dataset;
determining, based on the setting copy priorities, that the respective data in the dataset is stored in a non-volatile write cache (NVWC) of the source volume and an old version of the data is stored in a disk of the source volume that has been copied to the target volume;
setting a first priority that is lower than a highest priority for the respective data; and
transmitting, by one or more processors, the respective data in the order of the copy priorities from the source volume to the target volume, wherein the copy priorities are dynamically adjusted in response to a write data version and a write data frequency.

2. The computer-implemented method of claim 1, wherein setting copy priorities for the respective data in the dataset further comprises:
in response to a determination that the respective data of the dataset held in the NVWC is a new version of a data stored in the disk of the source volume, setting a second priority that is higher the first priority and lower than the highest priority for both the respective data held in the NVWC and the respective data stored in the disk.

3. The computer-implemented method of claim 2, wherein setting copy priorities for the respective data in the dataset further comprises:
assigning a third priority that is lower than the first priority in the order of write frequencies such that a high priority is associated with a high write frequency.

4. The computer-implemented method of claim 1, wherein dynamically adjusting the copy priorities during transmission that are based on the write frequency are referenced to the write frequency of an associated address, wherein a higher write frequency has a higher priority than a lower write frequency, and wherein copying the higher write frequency faster further reduces the chance of a write data collision.

5. The computer-implemented method of claim 4, wherein dynamically adjusting the copy priorities during transmission that are based on the write data version include a new version of data, wherein the new version of data resets the copy priority to a lower priority that is lower than the highest priority for the respective data in the disk.

6. The computer-implemented method of claim 4, wherein adjusting the copy priorities dynamically further comprises:
in response to arrival of a new version of data corresponding to a data in the NVWC of the source volume for the first time, resetting the copy priority for the respective data in the NVWC to the highest priority.

7. The computer-implemented method of claim 6, wherein adjusting the copy priorities dynamically further comprises:
in response to a determination that there is a corresponding data in the disk of the source volume that is an old version of the new version of data, resetting the priority for the respective data in the disk of the source volume to the highest priority.

8. A system comprising:

one or more processors; and a computer-readable memory coupled to the one or more processors, the computer-readable memory comprising instructions that when executed by the one or more processors perform actions of:

forming a consistency group defining a dataset of point-in-time data to be copied from a source volume to a target volume;

setting, by one or more processors, copy priorities for respective data in the dataset;

determining, based on the setting copy priorities, that the respective data in the dataset is stored in a non-volatile write cache (NVWC) of the source volume and an old version of the data is stored in a disk of the source volume that has been copied to the target volume;

setting a first priority that is lower than a highest priority for the respective data; and transmitting, by one or more processors, the respective data in the order of the copy priorities from the source volume to the target volume, wherein the copy priorities are dynamically adjusted in response to a write data version and a write data frequency.

9. The system of claim 8, the computer-readable memory comprising instructions that when executed by the one or more processors perform further actions of:

in response to a determination that the respective data of the dataset held in the NVWC is a new version of a data stored in the disk of the source volume, setting a second priority that is higher the first priority and lower than the highest priority for both the respective data held in the NVWC and the respective data stored in the disk.

10. The system of claim 9, the computer-readable memory comprising instructions that when executed by the one or more processors perform further actions of:

assigning a third priority that is lower than the first priority in the order of write frequencies such that a high priority is associated with a high write frequency.

11. The system of claim 8, wherein dynamically adjusting the copy priorities during transmission that are based on the write frequency are referenced to the write frequency of an associated address, wherein a higher write frequency has a higher priority than a lower write frequency, and wherein copying the higher write frequency faster further reduces the chance of a write data collision.

12. The system of claim 11, wherein dynamically adjusting the copy priorities during transmission that are based on the write data version include a new version of data, wherein the new version of data resets the copy priority to a lower priority that is lower than the highest priority for the respective data in the disk.

13. The system of claim 11, the computer-readable memory comprising instructions that when executed by the one or more processors perform further actions of:

in response to arrival of a new version of data corresponding to a data in the NVWC of the source volume for the first time, resetting the copy priority for the respective data in the NVWC to the highest priority.

14. The system of claim 12, the computer-readable memory comprising instructions that when executed by the one or more processors perform further actions of:

in response to a determination that there is a corresponding data in the disk of the source volume that is an old version of the new version of data, resetting the priority for the respective data in the disk of the source volume to the highest priority.

15. A computer program product comprising a computer readable storage medium having program instructions embodied therewith, the program instructions executable by a processor to cause the processor to perform actions of:

forming a consistency group defining a dataset of point-in-time data to be copied from a source volume to a target volume;

setting, by one or more processors, copy priorities for respective data in the dataset;

determining, based on the setting copy priorities, that the respective data in the dataset is stored in a non-volatile write cache (NVWC) of the source volume and an old version of the data is stored in a disk of the source volume that has been copied to the target volume;

setting a first priority that is lower than a highest priority for the respective data; and transmitting, by one or more processors, the respective data in the order of the copy priorities from the source volume to the target volume, wherein the copy priorities are dynamically adjusted in response to a write data version and a write data frequency.

16. The computer program product of claim 15, the program instructions executable by a processor to cause the processor to perform further actions of:

in response to a determination that the respective data of the dataset held in the NVWC is a new version of a data stored in the disk of the source volume, setting a second priority that is higher the first priority and lower than the highest priority for both the respective data held in the NVWC and the respective data stored in the disk.

17. The computer program product of claim 16, the program instructions executable by a processor to cause the processor to perform further actions of:

assigning a third priority being lower than the first priority in the order of their write frequencies such that high priority is associated with high write frequency.

* * * * *